(12) United States Patent
Storione et al.

(10) Patent No.: US 7,320,586 B2
(45) Date of Patent: Jan. 22, 2008

(54) CONTAINER BLOWING DEVICE

(75) Inventors: Savino Storione, Versoix (CH); Daniel Jover, Prangins (CH)

(73) Assignee: Technoplan Engineering S.A., Plan-Les-Ouates (CH)

( * ) Notice: Subject to any disclaimer, the term of this patent is extended or adjusted under 35 U.S.C. 154(b) by 613 days.

(21) Appl. No.: 10/483,646

(22) PCT Filed: Jul. 18, 2002

(86) PCT No.: PCT/IB02/02845

§ 371 (c)(1),
(2), (4) Date: Jan. 13, 2004

(87) PCT Pub. No.: WO03/009993

PCT Pub. Date: Feb. 6, 2003

(65) Prior Publication Data

US 2004/0173949 A1    Sep. 9, 2004

(30) Foreign Application Priority Data

Jul. 20, 2001    (FR) .................................. 01 09744

(51) Int. Cl.
*B29C 49/58* (2006.01)
(52) U.S. Cl. ..................................... 425/535
(58) Field of Classification Search ................. 425/535
See application file for complete search history.

(56) References Cited

U.S. PATENT DOCUMENTS

| | | | |
|---|---|---|---|
| 3,400,636 A * | 9/1968 | Schneider | 91/452 |
| 4,488,863 A * | 12/1984 | Collette | 425/530 |
| 5,141,682 A | 8/1992 | Steinbichler et al. | |
| 5,173,241 A | 12/1992 | Shibuya et al. | |
| 5,648,026 A * | 7/1997 | Weiss | 264/37.16 |
| 5,817,348 A * | 10/1998 | Ikeda | 425/529 |
| 6,423,253 B1 * | 7/2002 | Bunel et al. | 264/37.16 |
| 6,709,611 B1 * | 3/2004 | Emmer et al. | 264/37.16 |
| 7,004,745 B2 * | 2/2006 | Galloni | 425/182 |
| 2006/0197263 A1 * | 9/2006 | Crider et al. | 264/529 |

FOREIGN PATENT DOCUMENTS

| | | |
|---|---|---|
| DE | 31 11 925 A1 | 10/1982 |
| EP | 0 655 313 A1 | 5/1995 |
| EP | 0 655 314 A1 | 5/1995 |
| GB | 569093 | 5/1945 |
| JP | 54-33566 | 3/1979 |
| JP | 5-309726 A | 11/1993 |
| WO | WO 96/25285 A1 | 8/1996 |
| WO | WO 99/04951 A1 | 2/1999 |
| WO | WO 00/06365 A1 * | 2/2000 |

\* cited by examiner

*Primary Examiner*—Robert B. Davis
(74) *Attorney, Agent, or Firm*—Crompton, Seager & Tufte, LLC

(57) ABSTRACT

The invention concerns a device for blowing containers, in particular bottles, from a preform with a gas and recuperating said gas, comprising at least means for supplying the device with gas at a first pressure and at a second pressure, drawings means and container forming means. It comprises means for recuperating said gas until a predetermined expansion pressure is reached in the container, means for controlling said recuperating means and adjusting means for adjusting the operating conditions of said control means.

6 Claims, 4 Drawing Sheets

CONTAINER BLOWING DEVICE

TECHNICAL FIELD

The present invention relates to a device for blowing packaging, particularly bottles from a preform using a gas and for recovering said gas, comprising at least means for supplying the device with gas at a first pressure and at a second pressure, means for stretching and means for forming the packaging.

The present invention also relates to a method for blowing, by means of a gas, packaging in a mold from a preform and for recovering the blowing gas.

BACKGROUND OF THE INVENTION

There are numerous problems in the field of plant for blowing packaging, for example bottles, made of synthetic materials. First of all, it is necessary to have a gas, such as air, at a high pressure of the order of 40 bar in order to blow the packaging in a mold. To compress the gas use is conventionally made of compressors. However, in certain blowing methods, the preform is first of all pre-blown to convert it into a packaging and then undergoes actual blow-molding proper. The pre-blowing is performed at a pressure of around 10 bar, then the blowing reaches a pressure of 40 bar. One first way of obtaining these two working pressures is to use two compressors, one to generate the 10-bar pressure and the other to generate the 40-bar pressure. However, the use of two compressors is expensive both in terms of initial outlay to purchase them and in terms of the maintenance they require.

Another option is to use just one compressor compressing the gas to 40 bar, then to expand some of the compressed gas to 10 bar for the pre-blowing operation. This method is not very advantageous either because energy is wasted compressing a gas whose pressure is reduced without having used it in the manufacturing process.

In addition, once the packaging has been formed by blowing, the compressed gas used (which is at a pressure of about 40 bar) is released to the open air and this constitutes a waste of energy.

Hence, it has proved necessary to improve the known methods and machines in order to enhance their efficiency and reduce wasted energy.

Machines and methods for the manufacture of packaging, particularly bottles made of PET, by blowing are known from the prior art. French Patent Application 2 662 631 for example describes such a machine and such a method. According to the method described, a preform fixed to an air distributor is brought into a mold, the distributor is connected with a source of pressurized air, said air being introduced into the preform in such a way as to press the walls of the preform against the edges of the mold, thus forming the desired packaging. In the method described in that application, use is also made of a stretching ram, whose action, combined with that of the pressurized air, gives self-regulation over the balance between axial and transverse deformation of the preform resulting from a combined stretching and blowing method. In the machine described in that patent application, the pressurized air blown into the preform is also used to operate the stretching ram. Once the packaging is formed, the blown air is discharged to the open air.

The anterior publication WO 96/25285 describes another method for blowing packaging, such as bottles for example, from a preform. According to the known method, a pre-blowing of the preform at a pressure of between 8 and 12 bar is performed, then the actual blowing is performed by injecting air at 40 bar. In that document also, the blowing gas is discharged to the open air once the packaging has been formed.

Patent Application EP 0 039 929 describes a method for blowing molded items in which the blowing gas is recovered and recycled for reuse.

More specifically, in that application, the blowing gas also has a function of treating the interior surface of the blown packaging, particularly to improve the impermeability of said interior surface, and for that purpose it contains an appropriate reagent. Once the blowing and treatment have been performed, the blowing gas is recovered for subsequent reuse, by means of a purging gas, said purging gas itself having to be purified of the reagent used.

Patent Application EP 0 655 313 describes a method and a device for recovering blowing air. In the method described, air at high pressure used for blowing a container is recovered directly in the low-pressure source. This has the disadvantage of creating pressure variations in the low-pressure source and these detract from the correct formation of the container. In addition, the blown container is held for a short length of time at the high blowing pressure, and this too detracts from the good quality of the blown container.

U.S. Pat. No. 5,173,241, finally, describes a method and an apparatus for recovering the blowing air in a plastics injection molding machine. In this prior art, the blown air is recovered in the recovery container by suction and is reintroduced into the system's compressor.

SUMMARY OF THE INVENTION

The object of the invention is to improve the known methods and devices.

More specifically, it is an object of the present invention to propose a machine for blowing and recovering the blowing gas that operates in a way that is simple and easy to adjust.

Another object of the invention is to optimize the recovery of the blowing air and to reduce the power consumption of the blowing machine.

Another object of the invention is to recycle the blowing gas and to reuse this gas for steps in the production of blow-molded packaging or for other purposes.

The invention is characterized in that it comprises recovery means for recovering the blowing gas until a predetermined expanded pressure is reached in the packaging, control means for controlling said recovery means and adjusting means to adjust the operation of said control means.

The recovery means comprise at least one recovery valve and a recovery volume, said valve allowing the blowing gas to be expanded in the recovery volume or in the open air by means of a piston moving in the recovery valve.

According to a first embodiment, the recovery valve is controlled by mechanical means comprising at least one cam actuating a distributor which controls the position of the piston of said valve.

According to a second embodiment, the recovery valve is controlled by mechanical means associated with electric means comprising at least one movement-detection system, such as a toothed wheel combined with a sensor, connected to a programmable controller which drives a distributor controlling the position of the piston of said valve.

According to a third embodiment, the recovery valve is controlled by a pressure sensor connected directly to a programmable controller which drives a distributor controlling the position of the piston of said valve.

The expansion valve may comprise means for balancing the internal pressure of the valve, said means being formed either by a drilling in the piston or by an external addition of pressurized gas.

The method for blowing, by means of a gas, packaging in a mold from a preform and for recovering the blowing gas, comprises at least the following steps:

pre-blowing the gas into the preform at a first pressure;

blowing the gas into the preform at a second pressure in order to obtain the packaging; and it is characterized by the following steps:

recovering the gas at the second pressure until a predetermined third pressure is obtained in the packaging;

expanding the recovered gas to a recovery pressure;

expanding the residual gas in the packaging to the open air recycling the expanded gas.

Preferably, the first pressure is between 4 and 16 bar, the second pressure is between 25 and 40 bar and the third pressure is around 17 bar.

The recovered gas may be used to actuate preform-stretching rams, said rams being actuated during the pre-blowing and blowing steps or to actuate consumables of the packaging-production machine or is returned to a common compressed-gas circuit.

The advantages of the device and of the method according to the invention are many. Mention may in particular be made of the fact that a considerable saving in energy is made because of the reduction in the electrical power consumption of the compressor. In addition, the invention can be installed on existing machines, thus also reducing the costs of modifications.

Another advantage of the device and of the method according to the invention is that since the high-pressure air is recovered in a recovery volume, there is no influence on the low-pressure air (pre-blowing and/or the machine service air) at the time of recovery.

In addition, the recovered air is expanded before it is used in the low-pressure air (pre-blowing and/or machine service air) which means that it has no influence on the low pressure air either at the time of its use.

The recovered air reintroduced into the factory network is not expanded as it leaves the recovery volume, which means that the flow to the factory network is as rapid as possible.

The time for which the high pressure is sustained in the blown packaging is not shortened by the recovery method, but neither is the expansion time of the blowing method lengthened.

BRIEF DESCRIPTION OF THE DRAWINGS

The invention will be better understood by the description of one embodiment thereof and the figures relating thereto.

DETAILED DESCRIPTION OF THE INVENTION

Figure 1:
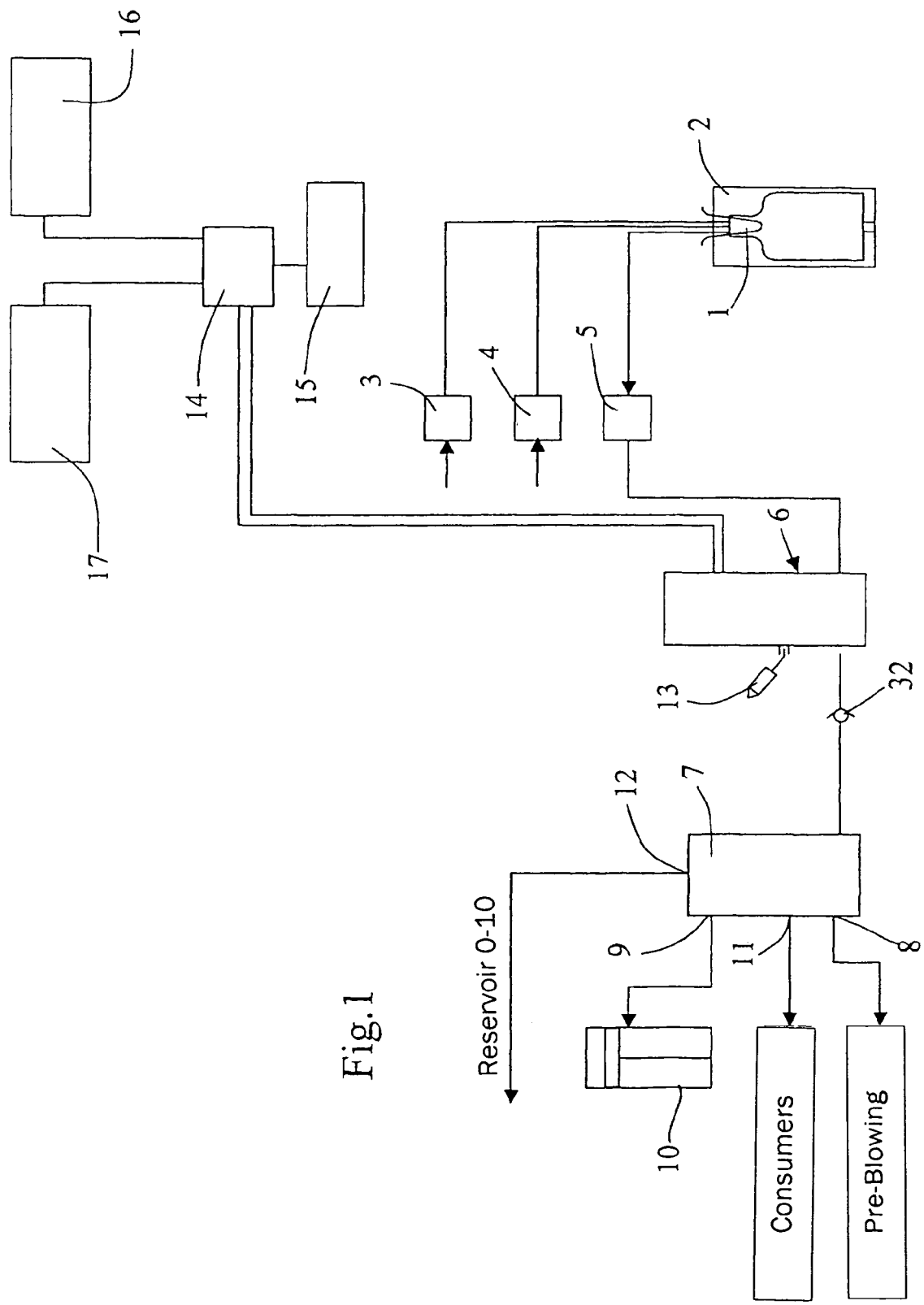
FIG. 1 shows an operating diagram for a machine according to the invention.

The invention is described first of all with reference to FIG. 1. In this figure, the blowing machine is a machine known per se from the prior art, such as the one marketed by SIDEL for example. In these known machines, as indicated hereinabove, a gas, for example air, is led in at a first pressure, known as the pre-blowing pressure, of between 4 and 16 bar, to pre-blow a preform 1 in the mold 2 to a pre-blowing valve 3, then gas, for example air, at a second pressure, known as the blowing pressure of the order of 25 to 40 bar, is led in to blow the packaging itself in the mold 2, through a blowing valve 4. The blowing pressure is dependent in particular on the complexity of the packaging to be blown: the more simple the shape with no particular detail, the lower the blowing pressure can be. Once the packaging has been blown, the gas in the packaging which is at blowing pressure is then recovered through a discharge valve 5 and a recovery valve 6 into a recovery volume 7. This recovery volume may consist of a reservoir or several reservoirs or may alternatively consist of a pipe of an appropriate volume which acts as the reservoir. In order not to slow the machine production cycle, only some of the gas at the blowing pressure may be recovered, the remainder of the gas being discharged through a silenced exhaust 13 to the open air.

Figure 3:
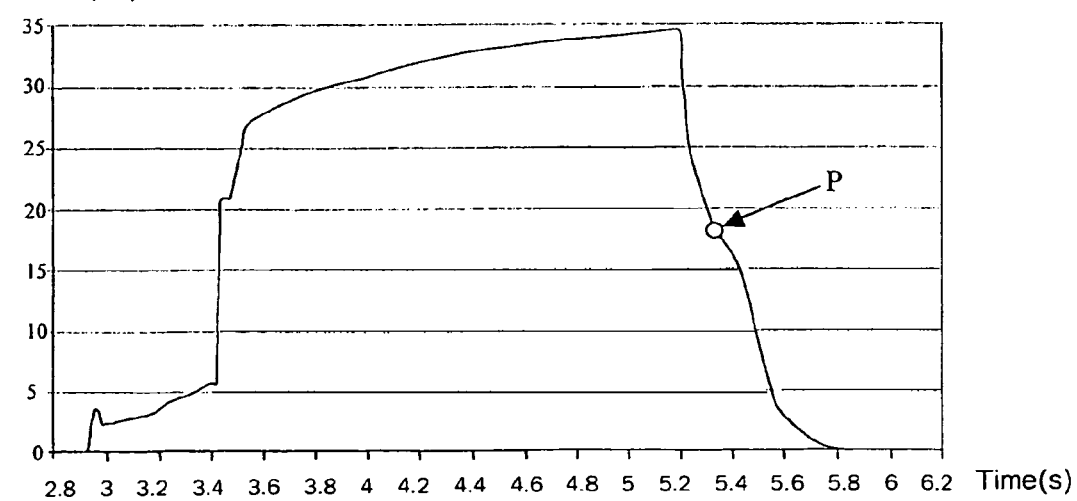
FIG. 3 is a curve illustrating the variation in pressure inside a blown packaging.

Preferably, the blowing gas is recovered until it reaches a pressure of about 17 bar in the blowing packaging, the remainder of the expansion taking place in the open air through the exhaust 13 (see FIGS. 1 and 3).

A gas recovered at a mean pressure of the order of 12 bar is thus obtained in the recovery volume. This gas recovered at the recovery pressure can then be recycled for other uses, which are dependent in particular on the configuration of the machine. A first use that can be made is to reuse this gas at pressure to perform the pre-blowing operation. Thus, the recovery volume can be connected on the one hand to the pre-blowing circuit, something depicted schematically by the expression "pre-blowing" of the outlet 8 in FIG. 1, for example to a pre-blowing reservoir, not depicted in the figure, which would be situated before the pre-blowing valve 3 in the machine circuit. Depending on the mean recovery pressure obtained and on the pre-blowing pressure at which the machine operates, it may be necessary to insert an expander between the recovery volume 7 and the pre-blowing reservoir so as to expand the recycled gas to the effective pre-blowing pressure. These parameters are often dependent on the production machine and need to be adjusted on an ad-hoc basis.

A second use to which the recovered gas may be put is that of actuating the rams 10 used to stretch the preform. As indicated above, pre-blowing and/or blowing is generally combined with longitudinal stretching of the preform 1 by means of said stretching ram 10 so as to combine axial and transverse deformation of the preform. These rams are either actuated mechanically by a cam or actuated by means of a gas at a pressure of between about 7 and 10 bar. Thus, the volume may also be connected to the control circuit for the stretching rams 10, possibly through an expander (not depicted) to bring the gas to the pressure used to actuate the rams 10. This use is depicted schematically in FIG. 1 by the outlet 9 from the recovery volume 7, and the ram 10.

A third use to which the recovered gas may be put is that of actuating other consumer elements of the blowing machine, something which is depicted schematically by the word "consumers" in FIG. 1 and the outlet 11 from the recovery volume 7.

A fourth use to which the recovered gas may be put is that of returning it to the common gas supply lines, particularly air lines, of the premises in which such machines are installed and thus for supplying the compressor of the blowing machine that compresses the gas to 40 bar. Specifically, such industrial premises always use gas at pressure to operate machines and various devices which means that pressurized gas is always of use. This use is depicted schematically by the outlet 12 from the recovery volume and by the expression "reservoir 0-10" in FIG. 1.

The first three uses are particularly advantageous in rotary packaging blowing machines in as much as the recovered gas is reused on the machine itself which means that there is no need to employ rotary collectors for conveying the recovered gas to reservoirs outside of the machine.

The valve 6 is controlled by appropriate means which will be described in detail hereinbelow, particularly by a distributor 14, the control of which may be mechanical (mechanical control 15), electrical (electrical control 16) or associated with a pressure sensor (pressure control 17).

The method of blowing, by means of a gas, a packaging in a mold from a preform and for recovering the blowing gas, according to FIG. 1, comprises the following steps:

The pre-blowing valve 3 is opened, pre-blowing is performed at a first gas pressure (for example between 4 and 16 bar) into the preform 1 and the valve 3 is closed;

the valve 4 is opened, the gas is blown at a second pressure (for example between 25 and 40 bar) into the preform to obtain the packaging, and the blowing valve 4 is closed;

the discharge valve 5 is opened and the gas is recovered at the second pressure in a recovery volume 7 through the recovery valve 6 until a predetermined third pressure is obtained in the blown packaging.

As soon as the predetermined third pressure is achieved, the recovery valve 6 is closed and the remainder of the blowing gas, still under pressure, in the packaging is discharged to the open air. Thereafter, the blown packaging is removed from the blowing machine and continues its production cycle.

During pre-blowing and blowing, a stretching ram is actuated to stretch the preform 1.

The recovered gas is then used for other operations that require pressurized gas, particularly for pre-blowing, for actuating the stretching rams or other consumers, or alternatively the gas is recycled in a common compressed-gas circuit. All these operations of reusing the recovered gas can be coupled to an expanding of the recycled gas according to the pressure differences.

The method according to the invention allows of the order of 20 to 45% of the blowing gas to be recovered and allows the electrical power consumption to be reduced by the order of 15 to 45%.

Figure 2:
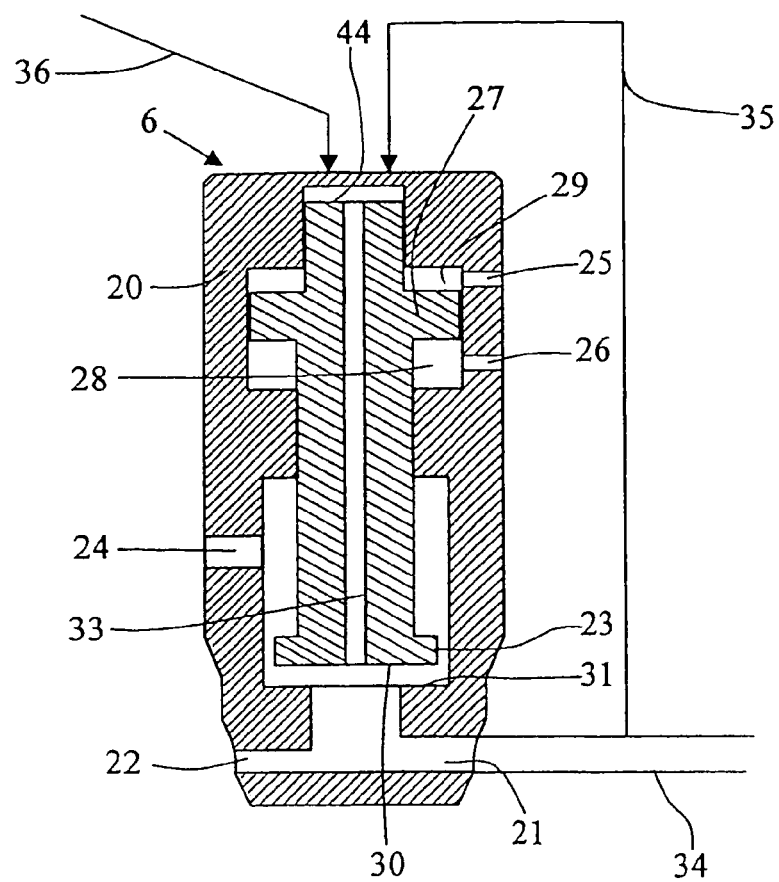
FIG. 2 shows one embodiment of a recovery valve according to the invention.

A particular element of the recovery system consists of the recovery valve 6. One embodiment of this valve 6 and alternative forms are described with reference to FIG. 2. This valve comprises a valve body 20, an inlet 21 for the gas arriving from the blown packaging, an outlet 22 for the recovered gas, which is connected to the recovery volume 7, a piston 23, an outlet 24 for the gas expanded to the open air, in the silencer 13 (FIG. 1). The body 20 of the valve also comprises two openings 25, 26 for actuating the movement of the cylinder in the body by means of a gas, such as compressed air, said openings being connected to the distributor 14 in FIG. 1. The piston 23 comprises an annular sector 27 of a diameter greater than the rest of the piston 23, this sector 27 forming with the body 10 of the valve two chambers 28, 29 which are connected respectively to the openings 26 and 25. The movement of the piston 23 in the body of the valve is thus controlled by the addition of a pressurized gas to one or other of said chambers 28, 29. If a gas, for example air, is sent into the chamber 28, the piston is pushed upward and this opens the valve 6 and the recovered gas arriving at the inlet 21 of the valve leaves via the outlet 24. If gas, for example air, is sent into the chamber 29, the piston 23 descends and the frontal surface 30 of the piston 23 comes into contact with a corresponding surface 31 of the body of the valve 20, and this has the effect of closing the valve and of allowing the gas arriving at the inlet 21 to be recovered, this re-emerging at the outlet 22, bound for the recovery volume 7 (FIG. 1). As a preference, a nonreturn valve 32 is placed on the line connecting the outlet 22 and the recovery volume 7, so as to prevent the gas contained in the volume 7 from expanding when the piston 23 is in the raised position and gas is sent to the open air.

The piston 23 of the valve 6 is particular in that it has a bore 33 which passes right along its length. This bore allows the pressure to be balanced between the surface 30 and the surface 44 of the piston 23 and makes it possible to avoid having to counterbalance the pressure of the recovered gas with the pressure in the chamber 29 when blowing gas whose pressure is of the order of 25 to 40 bar is recovered. To compensate for this pressure and avoid the piston 23 rising up during recovery, if only the pressure in the chamber 29 is available, it becomes necessary to significantly increase the size, particularly the surface area, of the sector 27 of the piston 23, and this increases the size of the valve 6 accordingly. By balancing the pressure in the valve 6 using the bore 33, a far lower pressure is needed to move the piston 23, and its size may remain small.

Of course, there are alternatives to the bore in the piston for achieving the same balancing effect. These alternatives are depicted schematically in FIG. 2 and it is possible, for example, to add pressurized gas from the outside through a specific duct 35 connected to the duct 34 conveying the recovered gas to the inlet 21 of the valve 6, or via another independent duct 36.

A curve representing change in pressure in packaging is given schematically in FIG. 3 by way of indicative example. First of all, we start with a pre-blowing step which causes the pressure to rise to about 6 bar, then we move on to the actual blowing step during which the pressure rises to about 35 bar at most, then we move on to a step of expanding the blowing gas, during which step the blowing gas is recovered. In order not to flatten the expansion curve, and therefore not to lengthen the cycle time of the production machine, the blowing gas is recovered until a pressure of about 17 bar is obtained in the packaging (point P in FIG. 3), the remainder of the gas then being discharged to the open air as described hereinabove.

A packaging blowing machine is described with reference to FIG. 4. This machine is a rotary production machine comprising ten successive and identical workstations for producing packaging. In this machine, the elements already mentioned beforehand are identified by the same numerical references. Just one workstation is therefore described in detail, the others being devised in the same way and it is important to note that the molds are not depicted in this view.

Here we find, in particular, a recovery valve 6 an outlet of which is connected to a recovery volume 7, in this case a reservoir in the shape of a banana, through a duct 37, and the other outlet of which is connected to the silenced exhaust 13. The inlet to the recovery valve 6 is connected to a selector valve 38 which, in this instance, can adopt three positions, the first position to allow pre-blowing gas to arrive in the preform, a second position to allow blowing gas to arrive in the preform, and a third position to allow the blowing gas to be discharged through the recovery valve 6 into the reservoir 7. This valve 38 corresponds to three valves 3, 4, 5 described with reference to FIG. 1, and the control to switch from one position to another is generally achieved using cams.

The position of the piston in the recovery valve 6 is controlled (see FIG. 2) in a first embodiment by means of a distributor 39 comprising a roller and collaborating with an adjustable cam 40 arranged beside the production machine. The action of the cam 40 on the roller allows the valve 6 to be closed by the distributor which sends a gas, such as air, under pressure into the chamber 29 (FIG. 2) of the valve 6 via one of the ducts 41 or 42 and therefore allows the recovery of the blowing gas. Thus, the length of the cam determines the time during which the blowing gas can be recovered because the rotational speed of the machine is known. In the case of FIG. 4, two workstations are in the blowing gas recovery phases, the workstations P1 and P2 and the workstation P3 is in the blowing phase and will be the next to arrive in the blowing gas recovery phase.

In this embodiment, the blowing gas recovered in the volume 7 is expanded and stored in a second reservoir 43 to be recycled particularly as pre-blowing gas.

Figure 4:
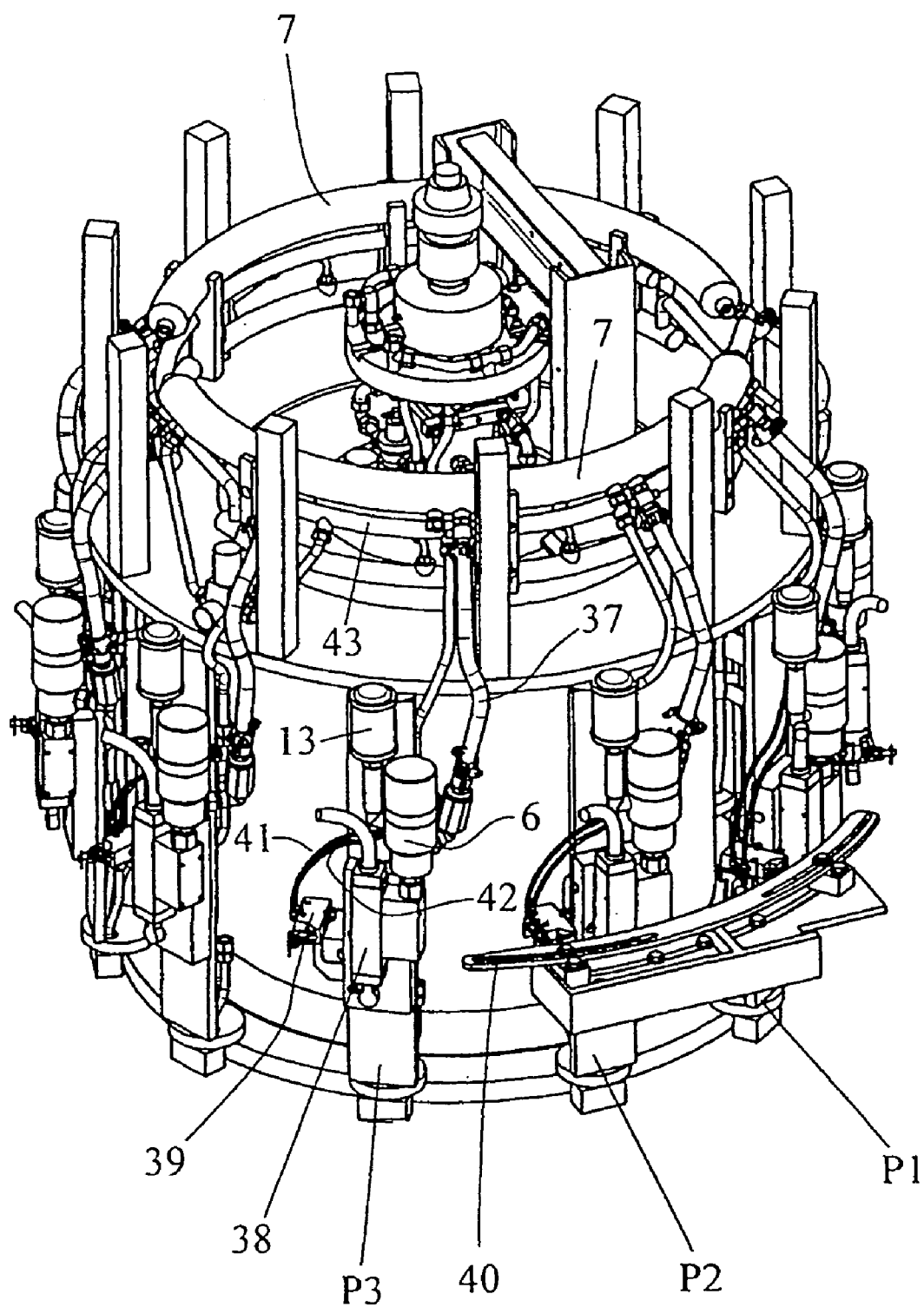
FIG. 4 shows a perspective view of one embodiment of a machine according to the invention with a first embodiment of a system for controlling the recovery valve.
Figure 5:
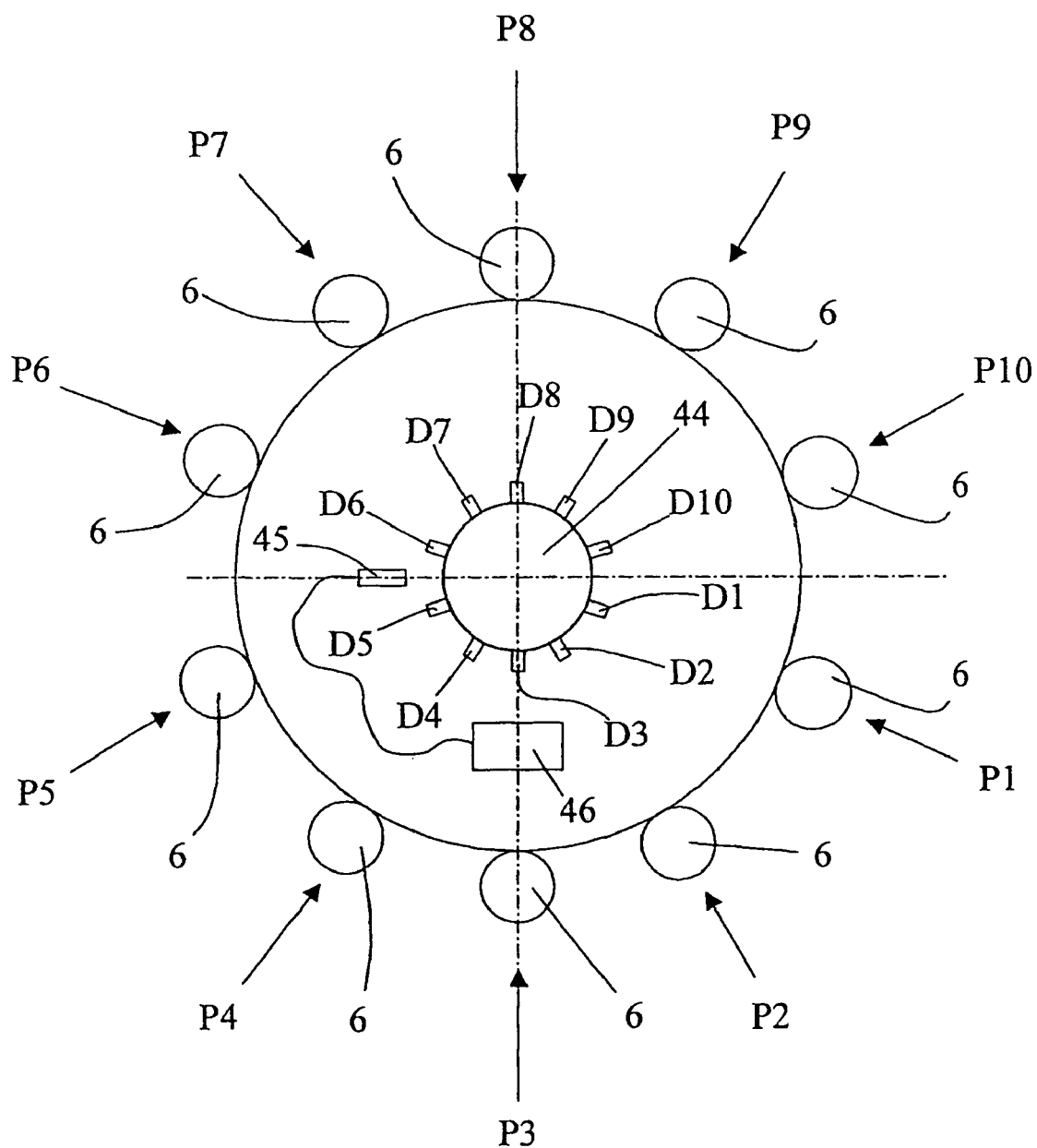
FIG. 5 shows a second embodiment of a system for controlling the recovery valve.

A second embodiment of the control of the valve 6, replaces the mechanical roller-cam system of FIG. 4 with an electromechanical system depicted schematically in FIG. 5. The machine depicted comprises, as in FIG. 4, ten successive blowing station figures P1 to P10. For reasons of simplification, these ten workstations have been depicted schematically by way of their recovery valves 6. A toothed wheel 44, the number of teeth D1 to D10 of which and the location of which teeth corresponds to the number of workstations and to their respective positions is positioned on the axis of the machine. A fixed sensor 45 is also needed so as to be able to detect the passage of each tooth D1 to D10 and this is connected to a programmable controller 46 which in particular controls the process of recovering the blowing gas. It is also essential to use means for initializing the system, for example one special tooth, so that once the machine has completed one revolution, the position of each workstation is known to the programmable controller. Thus, in this embodiment, it is no longer a cam which acts on the distributor (see FIG. 4) but the programmable controller 46 which directly and electrically controls the distributor acting on the valve to allow the recovery of the blowing gas.

For example, in the situation of FIG. 5, it may be considered that, between the workstations P10 and P9, a preform 1 is placed (FIG. 1), the workstations P9-P8-P7-P6 correspond to the pre-blowing operations, the workstations P6-P5-P4-P3-P2 correspond to the blowing operations, the workstations P2 and P1 to the expansion of the blowing gas and its recovery and the opening of the mold 2 (FIG. 2) and the removal of the packaging formed from the machine are performed between workstations P1 and P10. In this example, there is therefore time between workstations P1 and P2 to recover the blowing gas and the recovery valve 6 can be closed during this time so that the blowing gas can be transferred into the recovery volume. As the cycle time of the machine is known, it is easy to program the programmable controller to lower the piston of the valve 6 of a given workstation to allow recovery during a time T after the tooth corresponding to said given workstation has filed passed the sensor. The order to lower the piston of a valve may, incidentally, be given either after a certain number of teeth filed passed, which corresponds to a stopped position of the machine, or after a certain length of time, which corresponds to a moving position of the machine, for example when the workstation P3 of FIG. 5 is moving to adopt the position of workstation P2.

The time for which the gas is recovered can be determined either by calculation, taking account of the cycle times of the machine involved, but can also be fine-tuned on a machine in production. An important point of reference in the production of blown packaging is the moment at which the elements holding the packaging are uncoupled from the packaging and the seal between these elements and the packaging is broken: if the time allocated to the expansion of the blowing gas is too short, pressure in the packaging will still be higher than atmospheric pressure and as the seal is broken, there will be sudden expansion, which will generate noise. It is therefore possible, by ear, in a production machine with a determined cycle time, to determine whether the blowing gas has been fully expanded. Similarly, and particularly in the embodiment described hereinabove in which use is made of a programmable controller to control the recovery of the blowing gas during a determined time T, it is easily possible to vary this determined time T, by increasing it until the sudden expansion of the gas still contained in the blown packaging as the seal is broken occurs. As soon as this point is reached, said time T can be shortened until this sudden expansion disappears, and the optimum point for maximum recovery for blowing gas will have been reached.

Of course, such adjustment may also be carried out on a cam-controlled machine (see FIG. 4), but such adjustment is easier to perform with the programmable controller of the machine of FIG. 5.

In another embodiment, direct use may be made of a pressure sensor combined with a programmable controller which measures the pressure in the packaging to control the gas recovery valve and, for example, stop recovery when a predetermined pressure value is reached in the blown packagings. This embodiment is particularly advantageous in linear blow-molding machines in which all the packagings are blown at the same time. The blowing pressure is identical in all the packaging and just one pressure sensor will suffice. By contrast, in rotary machines such as those depicted in FIGS. 4 and 5, the blowing is sequential (one packaging after the other) which means that it is necessary to employ one pressure sensor per workstation. For cost reasons, this solution is therefore not advantageous in a sequential machine.

The present invention is not restricted to a rotary blow-molding machine with ten workstations as depicted in FIGS. 4 and 5 but applies to rotary machines comprising 1 to 48 workstations and also to linear blow-molding machines comprising between 1 and 40 workstations.

The invention claimed is:

1. A device for blowing packaging, particularly bottles from a preform using a gas and for recovering said gas, comprising at least means for supplying the device with gas at a first pressure and at a second pressure, means for stretching and means for forming the packaging, characterized in that it comprises recovery means for recovering said gas until a third predetermined pressure is reached in the packaging, said recovery means comprising at least one recovery volume and one recovery valve, control means for controlling said recovery means and adjusting means to adjust the operation of said control means;

wherein the recovery means is configured to expand residual gas within the packaging to open air while recovering said gas, both before and after the third predetermined pressure is reached in the packaging.

2. The device as claimed in claim 1, characterized in that the recovery means comprise at least one recovery valve and said recovery volume comprising at least one tank, said valve allowing the blowing gas to be expanded in the tank or in the open air by means of a piston moving in the recovery valve.

3. The device as claimed in claim 2, characterized in that the recovery valve is controlled by mechanical means comprising at least one cam actuating a distributor which controls the position of the piston of said valve.

4. The device as claimed in claim 2, characterized in that the recovery valve is controlled by mechanical means associated with electric means comprising at least one movement-detection system connected to a programmable controller which drives a distributor controlling the position of the piston of said valve.

5. The device as claimed in claim 2, characterized in that the recovery valve is controlled by a pressure sensor connected directly to a programmable controller which drives a distributor controlling the position of the piston of said valve.

6. The device as claimed in claim 1, characterized in that the recovery valve comprises means for balancing the internal pressure of the valve, said means being formed either by a drilling in the piston or by an external addition of pressurized gas.

* * * * *